(12) United States Patent
Choi et al.

(10) Patent No.: US 12,240,317 B2
(45) Date of Patent: Mar. 4, 2025

(54) FUEL PUMP MODULE FOR A VEHICLE

(71) Applicants: HYUNDAI MOTOR COMPANY, Seoul (KR); KIA CORPORATION, Seoul (KR)

(72) Inventors: Seung Hoon Choi, Seoul (KR); Gil Eon Kang, Suwon-si (KR); Chang Han Kim, Gwangju (KR); Seung Yup Oh, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 33 days.

(21) Appl. No.: 18/196,267

(22) Filed: May 11, 2023

(65) Prior Publication Data

US 2024/0157784 A1    May 16, 2024

(30) Foreign Application Priority Data

Nov. 15, 2022    (KR) .................. 10-2022-0152163

(51) Int. Cl.
*B60K 15/077* (2006.01)
*B60K 15/03* (2006.01)

(52) U.S. Cl.
CPC .. *B60K 15/077* (2013.01); *B60K 2015/03243* (2013.01); *B60K 2015/03256* (2013.01)

(58) Field of Classification Search
CPC ........ B60K 15/077; B60K 2015/03243; B60K 2015/03256
USPC ................................................. 137/565.11
See application file for complete search history.

(56) References Cited

U.S. PATENT DOCUMENTS

2004/0011336 A1 *  1/2004  Finch .................... F02M 37/50
                                                      123/574

FOREIGN PATENT DOCUMENTS

WO    WO-2010097826 A1 *  9/2010  ......... F02M 21/0212

* cited by examiner

*Primary Examiner* — Mahmoud Gimie
(74) *Attorney, Agent, or Firm* — Lempia Summerfield Katz LLC

(57) ABSTRACT

A fuel pump module for a vehicle includes: a pump positioned in a reservoir cup in a tank and configured to suction and discharge fuel from the reservoir cup; a mount plate mounted in an opening of the tank; a return valve on the mount plate and configured to pass return fuel, which is returned from an engine, into the tank; a shaft bracket connecting the mount plate and the pump in the tank and configured to fix the pump to the mount plate; a guide wall disposed on the shaft bracket to guide return fuel flowing in the tank through the return valve; and a channel disposed at the shaft bracket so that return fuel flows down and configured to discharge the return fuel into the reservoir cup.

18 Claims, 4 Drawing Sheets

FUEL PUMP MODULE FOR A VEHICLE

CROSS REFERENCE TO RELATED APPLICATION

The present application claims priority to Korean Patent Application No. 10-2022-0152163, filed Nov. 15, 2022, the entire contents of which are incorporated herein for all purposes by this reference.

BACKGROUND

Field of the Disclosure

The present disclosure relates to a fuel pump module for a vehicle and, more particularly, to a fuel pump module that can secure stabile fuel supply to an engine by inducing return fuel, which flows in a tank through a return valve, into a reservoir cup.

Description of the Related Art

In general, vehicles using liquified petroleum gas (LPG) fuel (hereafter, referred to as "LPG" vehicles) are equipped with a fuel supply system that returns a portion of fuel, which has been supplied to an engine, to an LPG tank, cylinder, bombe, or the like.

That is to say, it is difficult to accurately control the amount of fuel because LPG fuel vaporizes due to high temperature in an engine (vapor lock). Thus, LPG vehicles are equipped with a system that supplies much more fuel than the amount required for actual combustion using a fuel pump. The fuel remaining after combustion is returned to an LPG tank.

FIG. 1 is a view illustrating problems in the related art. As shown in FIG. 1, a tank 1, i.e., a storage cylinder, vessel, bombe, or the like, stores LPG fuel. A reservoir cup 2 is installed in the tank 1 so that fuel can be supplied efficiently to an engine (not shown) without a loss of fuel. A fuel pump 3 is provided for delivering the LPG fuel to the engine.

As shown in the figures, since the fuel pump 3 is disposed in the reservoir cup 2 in the tank 1, the LPG fuel in the reservoir cup can be stably supplied to the engine by the fuel pump.

In a normal state, after the LPG fuel in the tank 1 is supplied to the engine by the fuel pump 3, the unused fuel remaining after some of the fuel is combusted in the engine is returned to the tank through a return line and a return valve. In this case, the fuel returned in the tank is supplied in a manner so that the fuel vertically drops into the reservoir cup 2 due to gravity and its own weight (see "A"). The fuel dropped in the reservoir cup through the return valve contributes to stabilizing the start of the engine.

However, when a vehicle accelerates, as shown in FIG. 1, the fuel returned from the tank 1 flies, i.e., is forced rearward in the direction opposite to the traveling direction of the vehicle (see "B"). That is to say, the fuel flowing in the tank 1 through the return valve obliquely drops rearward and downward, rather than falling or dropping vertically, due to acceleration of the vehicle and the resultant inertia. Thus, the returned fuel may drop outside the reservoir cup 2.

When the returned fuel flowing in the tank 1 flows obliquely, i.e. rearward and downward, the fuel drops outside the reservoir cup 3. As a result, the reservoir cup 2 is not quickly filled with fuel, so fuel may not be readily available to the fuel pump 3. Thus, fuel cannot be stably supplied to the engine and the engine may be stopped because of a low fuel condition.

SUMMARY

Accordingly, the present disclosure has been made in an effort to solve the problems described above. An objective of the present disclosure is to provide a liquified petroleum gas (LPG) fuel pump module that can secure stabile fuel supply to an engine. The LPG fuel pump module does so by inducing LPG fuel, which flows in a tank through a return valve, into a reservoir cup even when a vehicle is accelerating. Another objective of the present disclosure is to provide a LPG fuel pump module that can prevent the engine from being stopped due to a shortage of fuel in the reservoir cup.

The objectives of the present disclosure are not limited to those described above. Other objectives not stated herein should be apparent to and understood by those having ordinary skill in the art to which the present disclosure belongs from the following description.

In order to achieve the objectives, according to an embodiment of the present disclosure, a fuel pump module for a vehicle is provided. The fuel pump module includes a pump positioned in a reservoir cup in a tank and configured to suction and discharge fuel from the reservoir cup. The fuel pump module also includes a mount plate mounted in an opening of the tank and a return valve installed on the mount plate and configured to pass return fuel, which is returned from an engine, into the tank. The fuel pump module also includes a shaft bracket connecting the mount plate and the pump to each other in the tank and configured to fix the pump to the mount plate. The fuel pump module also includes a guide wall disposed on the shaft bracket to guide return fuel flowing in the tank through the return valve. The fuel pump module also includes a channel disposed at the shaft bracket so that return fuel guided by the guide wall flows down. The channel is configured to discharge the return fuel, which flows down, into the reservoir cup.

Accordingly, in the fuel pump module for a vehicle according to the present disclosure, the guide wall is formed on the plate coupling part of the shaft bracket and blocks return fuel, which flows in the tank, from spraying or dispersing laterally when a vehicle accelerates. Also, the channel is formed at the shaft part that is the body of the shaft bracket and guides return fuel downward from the plate coupling part. Thus, return fuel can be stably collected in the reservoir cup by the guide wall and the channel even when a vehicle is accelerating.

As described above, since the guide wall and the channel formed at the shaft bracket guide the return fuel, which flows in the tank, into the reservoir cup, it is possible to secure stabile fuel supply to an engine from the tank. It is also possible to prevent an engine from being stopped due to a shortage of fuel in the reservoir cup.

Further, the fuel pump module of the present disclosure can stably supply return fuel to the reservoir cup even without using a fuel-resistant fluoro-rubber hose to guide return fuel into the reservoir cup to secure stabile fuel supply as in the related art. Thus, there is an effect of reducing the manufacturing cost by not having to include such a hose.

Further, in the fuel pump module of the present disclosure, parts related to lines through which return fuel flows are integrally applied to the shaft bracket to secure stable fluid flow of the return fuel in a tank. Thus, it is possible to reduce the number of parts as compared with using separate line parts in the related art. Thus, it is possible to achieve an effect of further reducing the manufacturing cost.

BRIEF DESCRIPTION OF THE DRAWINGS

The accompanying drawings of this specification exemplify various embodiments and aid in understanding the present disclosure together with the following detailed description. Thus, the present disclosure should not be construed as being limited to or by the drawings.

DETAILED DESCRIPTION

Figure 1:
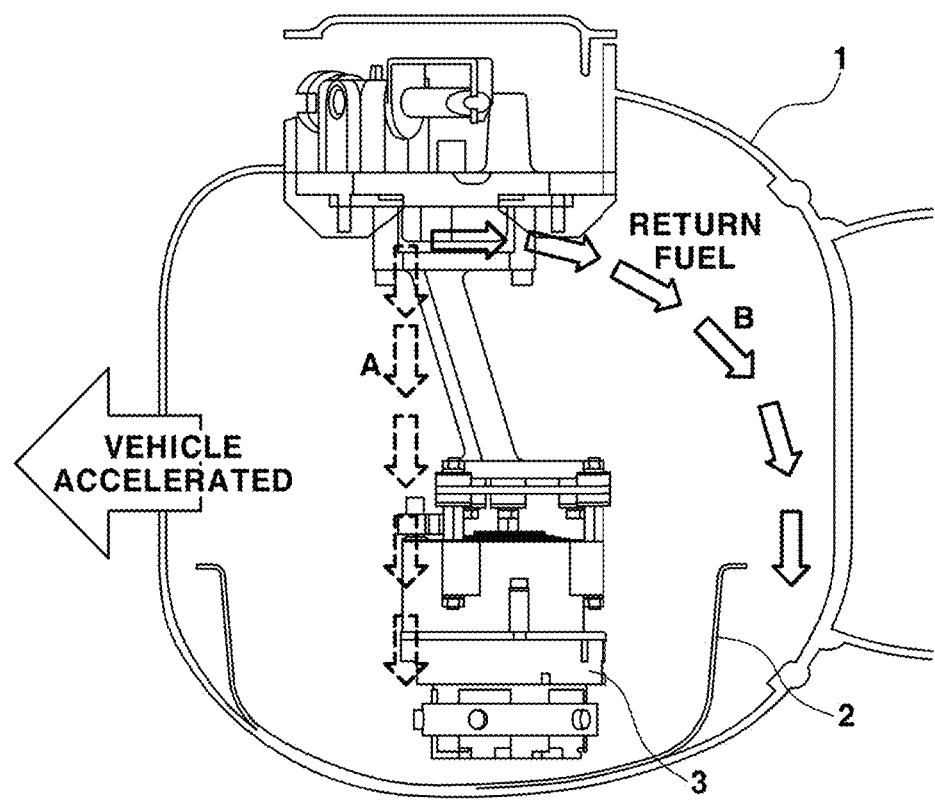
FIG. 1 is a view of a fuel pump module illustrating problems in the related art.

Embodiments of the present disclosure are described hereafter in detail with reference to the accompanying drawings. Description of specific structures and functions disclosed in embodiments of the present disclosure are only examples for describing the embodiments according to the concept of the present disclosure. The embodiments according to the concept of the present disclosure may be implemented in various ways. The present disclosure is not limited to the embodiments described herein and should be construed as including all changes, equivalents, and replacements that are included in the spirit and the range of the present disclosure.

It should be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that, when one element is referred to as being "connected to" or "coupled to" another element, it may be connected directly to or coupled directly to another element or may be connected to or coupled to another element, having yet another element intervening therebetween. On the other hand, it is to be understood that, when one element is referred to as being "connected directly to" or "coupled directly to" another element, it may be connected to or coupled to another element without another element intervening therebetween. Further, the terms used herein to describe a relationship between elements, i.e., "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated otherwise.

The terms "comprise" and/or "comprising" used herein do not exclude that another component, step, operation, and/or element exist or are added in the stated component, step, operation, and/or element. When a component, device, element, or the like, of the present disclosure, is described as having a purpose or performing an operation, function, or the like, the component, device, or element should be considered herein as being "configured to" meet that purpose or to perform that operation or function.

The present disclosure relates to an automotive fuel pump module, i.e., a liquified petroleum gas (LPG) pump module installed in a tank and pumping up fuel stored in the tank to an engine in an LPG vehicle.

In particular, the present disclosure provides an LPG fuel pump module that can secure stabile fuel supply to an engine of a vehicle by inducing fuel, which flows in a tank through a return valve, into a reservoir cup even when the vehicle is accelerating.

Figure 2:
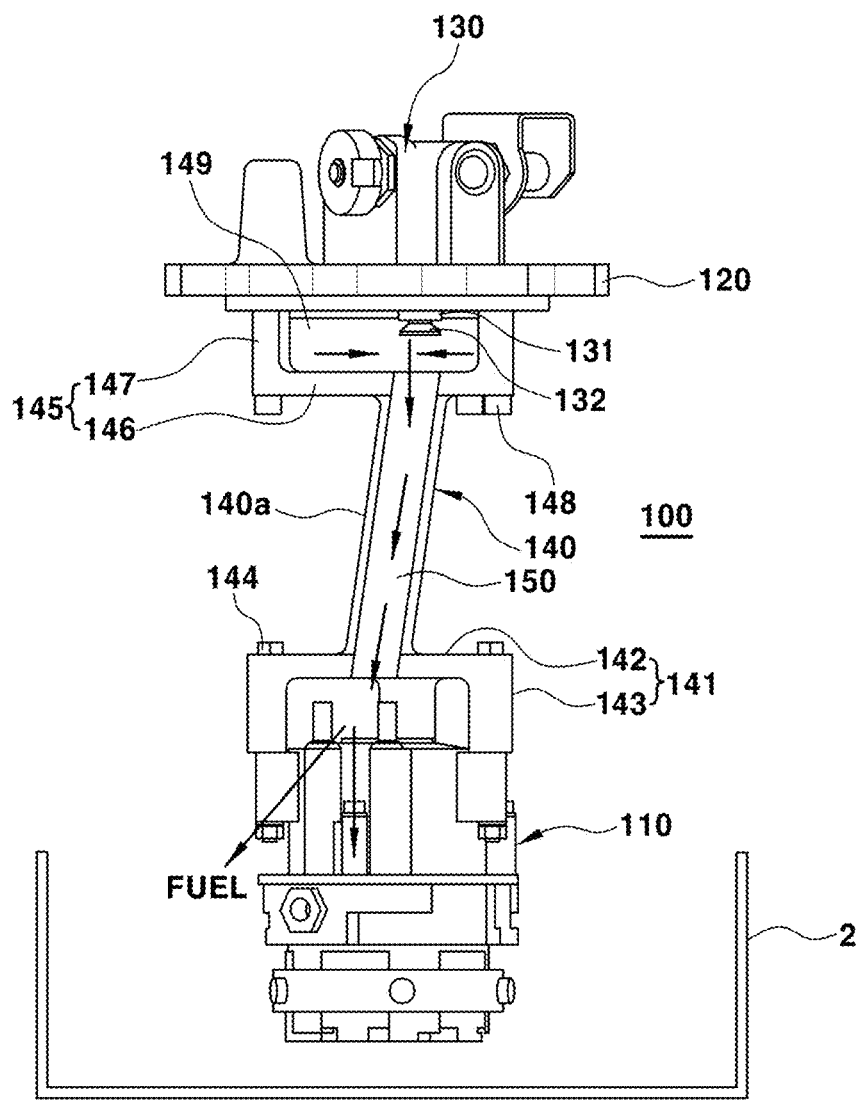
FIG. 2 is a perspective view showing a fuel pump module according to an embodiment of the present disclosure.

FIG. 2 is a perspective view showing a fuel pump module according to an embodiment of the present disclosure. A fuel pump module 100 is disposed in a tank (not shown) and a reservoir cup 2 is disposed around a pump 110 of the fuel pump module 100 in the tank.

The installation state, installation position, mounted structure of a reservoir cup in a tank storing fuel, the shape of the reservoir cup, the function of the reservoir cup, etc. in an LPG vehicle have been well known to those of ordinary skill in the art in various ways.

A well-known reservoir cup can be applied when the fuel pump module according to the present disclosure is applied. Thus, such a reservoir cup is not described in detail herein.

When the fuel pump module 100 according to the present disclosure is applied, the reservoir cup 2 exemplified in FIG. 1 or 2 can be installed with the fuel pump module 100 in a tank. Also, in this case, the reservoir cup 2 may be installed to surround a pump 110 of the fuel pump module 100.

As shown in FIG. 2, the fuel pump module 100 according to an embodiment of the present disclosure includes a pump 110, a mount plate 120, a valve assembly 130, and a shaft bracket 140.

The pump 110 is installed in the reservoir cup 2 to suction and discharge fuel from the reservoir cup 2. A fuel discharge pipe or tube (not shown) is connected to a discharge port through which fuel is discharged from the pump 110. The fuel discharge pipe is connected to a fuel supply port (not shown) disposed at the mount plate 120. The fuel supply port at the mount plat 120 is a port for supplying fuel to an engine (not shown) through a fuel supply line (not shown).

The mount plate (also referred to as a "flange") 120 in the fuel pump module 100 is a part that is mounted in an opening of the tank (not shown) that stores fuel, closes the opening of the tank, and fixes other parts of the fuel pump module to the tank.

The valve assembly 130, which is installed on the mount plate 120, includes a return valve 131 and a return line (not shown) is connected to the return valve 131. The return line is a passage for returning fuel remaining in the engine to the tank and the fuel that is returned through the return line flows into the tank through the return valve 131.

Referring to FIG. 2, it can be seen that a portion of the return valve 131 is installed on the mount plate 120 and protrudes downward from the inner surface of the mount plate 120. A discharge port 132 of the return valve 131, through which return fuel is discharged, faces down on the inner surface of the mount plate 120 in the tank.

The return valve may be a kind of check valve that prevents backflow of fuel when fuel that remains after being delivered to the engine (i.e., fuel not used or combusted) is returned into the tank. The returned fuel that has passed through the return valve 131 flows down into the reservoir cup 2 in the tank.

The shaft bracket 140, which may also be called a shaft, tube, or the like, is a part connecting the pump 110 and the mount plate 120 to each other. A first end of the shaft bracket 140 is fastened and fixed to the inner surface of the mount plate 120 by a bolt 148, or the like. An opposite second end of the shaft bracket 140 is fastened and fixed to the pump 110 by a bolt 144, or the like.

Accordingly, the pump 110 can be fixed to the mount plate 120 through the shaft bracket 140. When the mount plate 120 is mounted in the tank, the pump 110 can be fixed in the tank through the shaft bracket 140 and the mount plate 120.

When the mount plate 120 is mounted to close the opening of the tank, the pump 110, which is fixed to the mount plate 120, can remain fixed in the tank by the shaft bracket 140 and the mount plate 120.

Meanwhile, a guide wall 149 and a channel 150 can control and guide flow of fuel flowing in the tank through the return valve 131 and are formed at the shaft bracket 140 in the fuel pump module 100 according to the present disclosure.

That is to say, the shaft bracket 140 of the fuel pump module 100 according to the present disclosure is configured such that fuel that has passed through the return valve 131 contacts the guide wall 129 and then flows down through the channel 150 in the tank.

Accordingly, even though fuel flowing in the tank may be forced or directed laterally (in the opposite direction to the traveling direction of a vehicle) instead of down due to acceleration of the vehicle and inertia when the vehicle is accelerating, the fuel can flow down through the channel 150 after hitting against the guide wall 149.

As described above, return fuel flowing in the tank through the return valve 131 can flow through or along the path determined by the guide wall 149 and the channel 150 of the shaft bracket 140. In particular, the return fuel can be stably collected in the reservoir cup 2 while flowing down into the reservoir cup 2 rather than dropping outside the reservoir cup 2.

Figure 3:
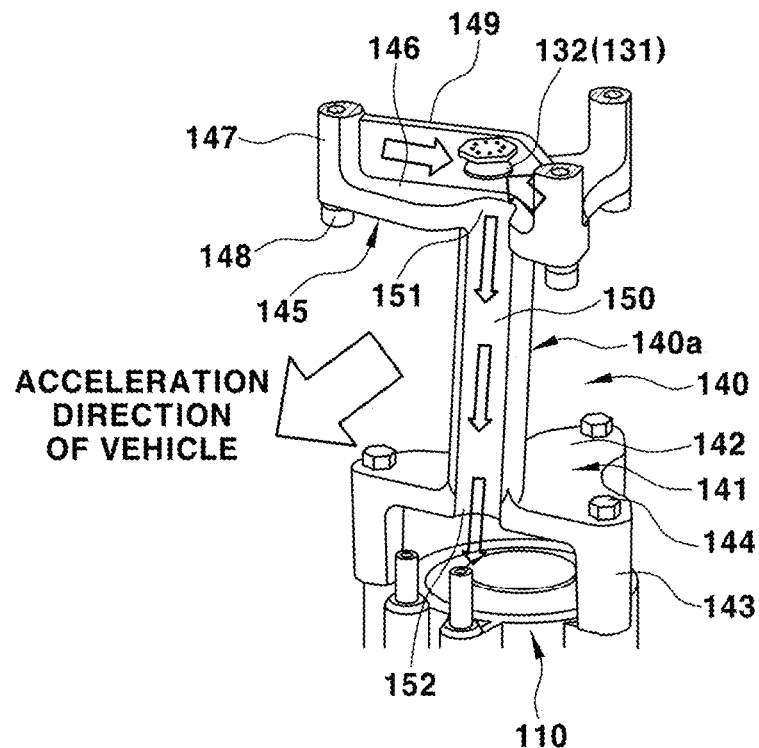
FIG. 3 is a perspective view showing a shaft bracket of the fuel pump module according to an embodiment of the present disclosure.
Figure 4:
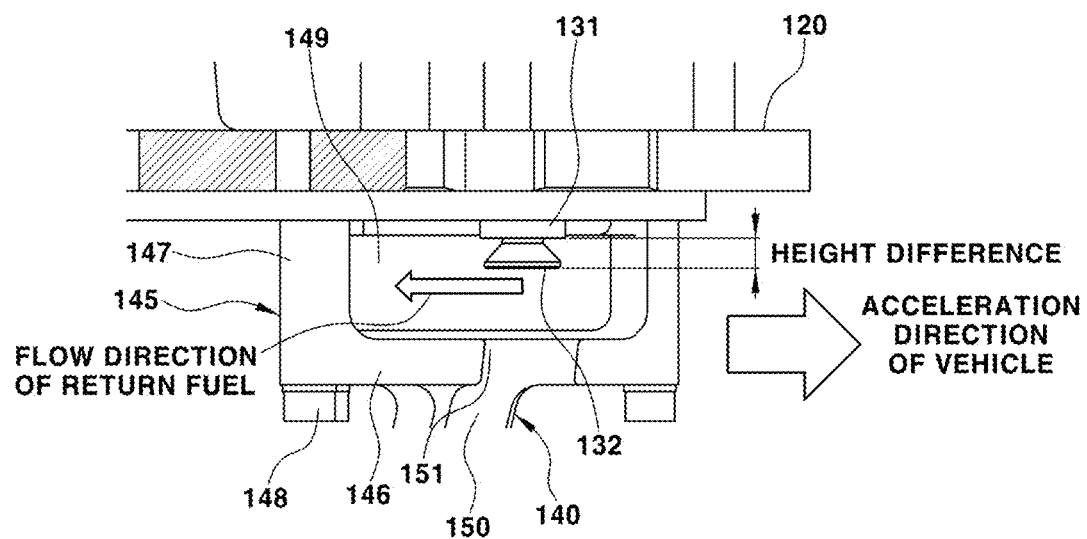
FIG. 4 is a front view showing a plate coupling part and a mount plate of the shaft bracket and a return pump in the fuel pump module according to an embodiment of the present disclosure.
Figure 5:
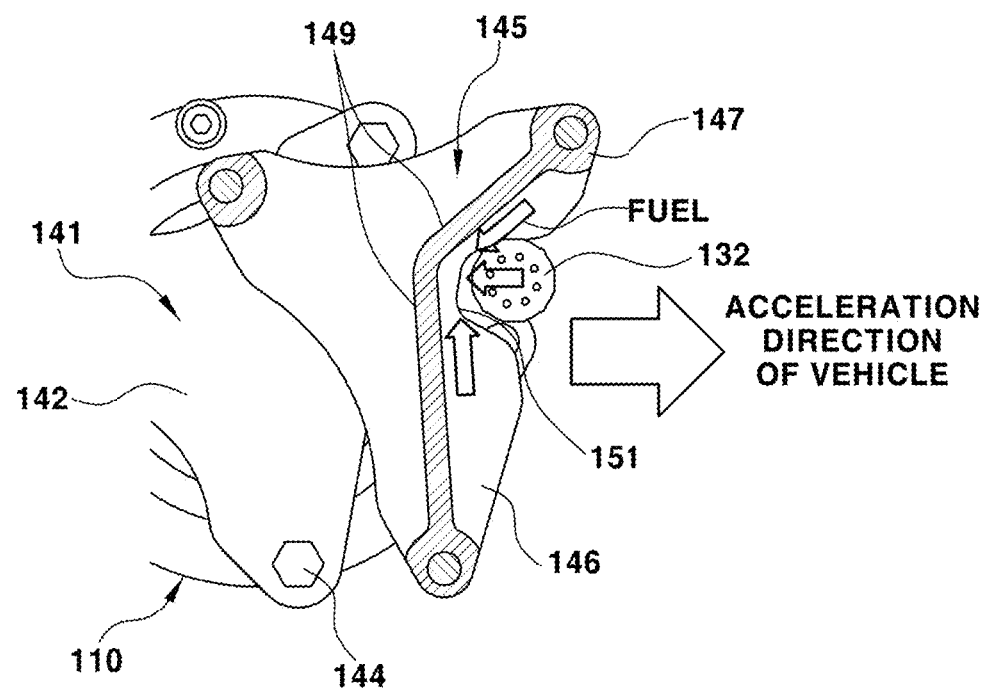
FIG. 5 is a plan view showing a shape of a guide wall formed at the plate coupling part of the shaft bracket in the fuel pump module according to an embodiment of the present disclosure.

FIGS. 3-5 are views showing an example in which a guide wall 149 and the channel 150 can control and guide flow of return fuel flowing in the tank and are formed at the shaft bracket 140 of the fuel pump module according to the present disclosure.

As shown in FIG. 3, the shaft bracket 140 has a pump coupling part 141 for coupling to the pump 110 at the lower end, which may be called a first end. The pump coupling part 141 has a plate portion 142 and a plurality of fastening portions 143 extending downward from the plate portion 141. The plate portion 142 of the pump coupling part 142 is a portion to which a shaft part 140a (as described below) is connected and in which the channel 150 of the shaft bracket 140 is formed.

The fastening portions 143 of the pump coupling part 141 each may be fastened to be fixed to the pump 110 by a bolt 144, or the like. Since the fastening portions 143 of the pump coupling part 141 are fastened to the pump 110, the shaft bracket 140 can be coupled to the pump 110 through the pump coupling part 141.

A plate coupling part 145 for coupling to the mount plate 120 is formed at the upper end, which may be called a second end of the shaft bracket 140. The plate coupling part 145 has a plate portion 146 and a plurality of fastening portions 147 extending upward from the plate portion 146.

The plate portion 146 of the plate coupling part 145 is a portion to which the shaft part 140a (as described below) is connected and in which the channel 150 of the shaft bracket 140 is formed.

The fastening portions 147 of the plate coupling part 145 each may be fastened to be fixed to the mount plate 120 by a bolt 148, or the like. Since the fastening portions 147 of the pump coupling part 145 are fastened to the mount plate 120, the shaft bracket 140 can be coupled to the mount plate 120 through the plate coupling part 145.

The plurality of fastening portions 147 may be formed to have a column shape on the top of the plate portion 146. The guide wall 149 may be formed on the top of the plate portion 146 to have a wall shape protruding upward to connect the fastening portions 147.

The guide wall 149 may be formed with a predetermined height to connect two adjacent fastening portions 147 on the top of the plate portion 146. The guide wall 149 may extend around the discharge port 132 of the return valve 131 on the top of the plate portion 146 to surround the side of the discharge port 132 of the return valve 131 mounted on the mount plate 120

The discharge port 132 of the return valve 131 has a portion with a discharge hole for discharging fuel, which has passed through the passage in the return valve 131 after returning through the return line from the engine into the tank. Referring to FIG. 4, it can be seen that the discharge port 132 of the return valve 131 protrudes downward with a predetermined height from the bottom of the mount plate 120.

The guide wall 149 of the shaft bracket 140 blocks and controls fuel, which may be dispersed or sprayed laterally after being discharged through the discharge port 132 of the return valve 13 in the tank when a vehicle is accelerating. To this end, the position of the guide wall 149 of the shaft bracket 140 on the top of the plate portion 146 of the plate coupling part 145 may be set in the direction in which fuel is forced when a vehicle is accelerating.

That is to say, since the guide wall 149 is formed to prevent return fuel from being sprayed, dispersed, or forced rearward due to forward acceleration of a vehicle, the guide wall 149 is formed and positioned behind the discharge port 132 of the return valve 131 in the front-rear direction of a vehicle and on the top of the plate portion 146 of the plate coupling part 145.

The upper end of the guide wall 149 on the top of the plate portion 146 of the plate coupling part 145 may be positioned higher than the discharge hole (not shown) of the discharge port 132 of the return valve 131.

That is to say, the height of the guide wall 149 is set such that the upper end of the guide wall 149 is positioned higher than the position of the discharge hole through which return fuel is discharged from the discharge port 132 of the return valve 131. Also, the upper end of the guide wall 149 is set higher than the lower end of the discharge port 132 at which the discharge hole of the return valve 131 is formed.

In an embodiment of the present disclosure, the guide wall 149 may be shaped such that fuel discharged from the discharge port 131 can be collected to the center after hitting against the guide wall 149 at a side of the discharge port 132 of the return valve 131.

To this end, as shown in the plan view of FIG. 5, the guide wall 149 is formed and positioned on the top of the plate portion 146 of the plate coupling part 145 and in a shape that surrounds the discharge port 132 of the return valve 131. In other words, the guide wall 149 may be formed substantially in a V-shape, a curved shape, or an arc shape around the discharge port 132 of the return valve 131 such that the discharge port 132 of the return valve 131 is positioned inside the guide wall 149.

The channel 150 is formed on the side of the shaft part 140*a* that connects the pump coupling part 141 and the plate coupling part 145 of the shaft bracket 140. The channel may be a groove that extends longitudinally on the side of the shaft part 140*a*.

The lower end of the channel 150 is formed in a groove shape on the side of the shaft part 140*a* and is open to communicate with the space under the plate portion 142 of the pump coupling part 141. Also, the upper end of the channel 150 is also open in order to communicate with the space over the plate portion 146 of the plate coupling part 145.

The channel 150 may be formed at a predetermined depth on the surface of the shaft part 140*a*, i.e., may be formed in a groove shape at an appropriate depth to have a channel cross-sectional area that enables return fuel to smoothly flow down in or along the channel 150.

In an embodiment of the present disclosure, the channel 150 of the shaft part 140*a* may be formed such that the inner surface of the groove shape, i.e., a cross-section thereof, has a semicircular shape. The channel 150 may be formed in a semicircular shape on the front surface of the shaft part 140*a* so that fuel in the channel 150 can efficiently flow down without flowing outside of the reservoir cup 2 due to a rearward force that acts on the return fuel when a vehicle is accelerating. In this configuration, the channel 150 of the shaft part 140*a* has a structure that is open in a forward facing direction, i.e., open forward in the acceleration direction of a vehicle and that is closed in the opposite rear facing or backward direction, which is opposite to the acceleration direction of a vehicle.

In an embodiment of the present disclosure, the channel 150 of the shaft part 140*a* may be configured by forming a groove having an open cross-section on the surface of the shaft part, as described above. However, the shaft part 140*a* may be provided in a closed tube or pipe type shape having a hole or flow passage therethrough (i.e., a hollow pipe type configuration).

That is to say, an internal channel 150 having a closed shape without being open on a side in cross-section may be formed through the shaft part 140*a*. In this case, the upper end of the internal channel 150 is open to communicate with the space over the plate portion 146 of the plate coupling part 145 so that return fuel can flow into and through the internal channel 150 of the shaft part 140*a*.

The internal channel 150 of the shaft part 140*a* may extend to the plate portion 142 of the pump coupling part 141. Thus, fuel can be induced to the pump 110 after passing through the internal channel 150 of the shaft part 140*a*. In this case, the outlet at the lower end of the internal channel 150 is open at a position at which fuel can be discharged toward the pump 110 from the lower end of the shaft part 140*a* or the plate portion 142 of the pump coupling part 141.

Accordingly, the fuel discharged to the space over the plate portion 146 of the plate coupling part 145 through the discharge port 132 of the return valve 131 can flow into the channel 150 through a channel inlet 151 after contacting the guide wall 149. Thereafter, the fuel is guided downward through the channel 150 and then discharged to the space where the pump 110 is positioned under the shaft bracket 140 through a channel outlet 152 at the lower end. The discharged fuel can then fill the reservoir cup.

In particular, according to the fuel pump module 100 of the present disclosure, even though fuel flowing in the tank through the return valve 131 may obliquely flow rearward or laterally in the space over the plate coupling part 145 of the shaft bracket 140 due to acceleration of a vehicle or inertia when the vehicle is accelerating, the return fuel flow is blocked by the guide wall 149 that blocks the rear side.

Further, the fuel contacting the guide wall 149 is guided to the position to be collected at which the channel inlet 151 of the shaft bracket 140 is positioned. The fuel then can flow down through the channel 150 of the shaft bracket 140 stably without flowing outside the reservoir cup 2 due to gravity and the acceleration of the vehicle.

The fuel flowing down through the channel 150 of the shaft bracket 140, as described above, can be discharged through the fuel outlet 152 and can flow into the reservoir cup 2 under the pump 110. Further, the fuel flowing down can be collected in the reservoir cup 2 and then stably supplied to the engine by the pump 110.

Therefore, in the fuel pump module 100 according to the present disclosure, the guide wall 149 blocks return fuel, which flows in the tank, from being laterally sprayed, dispersed, or forced when a vehicle is accelerating and is formed or positioned on the plate coupling part 145 of the shaft bracket 140. The channel 150 that guides return fuel downward from the plate coupling part 145 is formed or positioned at the shaft part 140*a*, which is the body of the shaft bracket 140. Thus, return fuel can be stably collected in the reservoir cup 2 by the guide wall 149 and the channel 150.

As described above, since the guide wall 149 and the channel 150 formed at the shaft bracket 140 guides return fuel, which flows in the tank, into the reservoir cup 2, it is possible to secure stabile fuel supply to an engine from the tank. It is also possible to prevent an engine from being stopped due to a shortage of fuel in the reservoir cup.

Further, the fuel pump module 100 of the present disclosure can stably supply return fuel to the reservoir cup, even without using a fuel-resistant fluoro-rubber hose that guides return fuel into the reservoir cup 2 to secure stability of fuel supply in the related art. Thus, there is an effect of reducing the manufacturing cost by eliminating the need for such a hose.

Further, in the fuel pump module 100 of the present disclosure, parts related to lines through which return fuel flows are integrally applied to the shaft bracket 140 to secure stable fluid flow of return fuel in a tank. Thus, it is possible to reduce the number of parts as compared with using separate line parts as in the related art. Thus, it is possible to achieve an effect of further reducing the manufacturing cost.

Although embodiments of the present disclosure are described above in detail, the spirit of the present disclosure is not limited thereto. The embodiments of the present disclosure may be changed and modified in various ways on the basis of the basic concept without departing from the scope of the present disclosure described in the following claims.

What is claimed is:

1. A fuel pump module for a vehicle, the fuel pump module comprising:
   a pump positioned in a reservoir cup in a tank and configured to suction and discharge fuel from the reservoir cup;
   a mount plate mounted in an opening of the tank;
   a return valve installed on the mount plate and configured to pass return fuel, which is returned from an engine, into the tank;

a shaft bracket connecting the mount plate and the pump to each other in the tank and configured to fix the pump to the mount plate;
a guide wall disposed on the shaft bracket to guide return fuel flowing in the tank through the return valve; and
a channel disposed at the shaft bracket so that return fuel guided by the guide wall flows down and configured to discharge the return fuel, which flows down, into the reservoir cup,
wherein the guide wall has a structure that is open in a forward facing direction relative to a vehicle forward acceleration direction and that is closed in an opposite rear facing direction relative to the vehicle forward acceleration direction.

2. The fuel pump module of claim 1, wherein the shaft bracket includes:
a plate coupling part coupled to the mount plate;
a pump coupling part coupled to the pump; and
a shaft part configured to connecting the plate coupling part and the pump coupling part to each other,
wherein the guide wall is formed at the plate coupling part.

3. The fuel pump module of claim 2, wherein the channel includes a groove on a surface of the shaft part and arranged in a longitudinal direction of the shaft part.

4. The fuel pump module of claim 3, wherein the channel has a groove shape that is open in cross-section toward a front of a vehicle so that return fuel can flow through the channel when the vehicle accelerates forward.

5. The fuel pump module of claim 2, wherein the shaft part is tube shaped and has a hole therein, and wherein the channel is the hole in the shaft part.

6. The fuel pump module of claim 2, wherein the plate coupling part includes:
a plate portion to which the shaft part is connected; and
a plurality of fastening portions extending upward from the plate portion and fastened to the mount plate,
wherein the guide wall protrudes upward from the plate portion to connect the fastening portions.

7. The fuel pump module of claim 6, wherein the channel includes a groove on a surface of the shaft part and arranged in a longitudinal direction of the shaft part.

8. The fuel pump module of claim 6, wherein a channel inlet of the channel is configured to receive return fuel guided by the guide wall and is open to communicate with a space over the plate portion of the plate coupling part.

9. The fuel pump module of claim 6, wherein a channel outlet of the channel is configured to discharge the return fuel flowing down and is formed at a position at which the return fuel can be discharged toward the reservoir cup at a lower end of the shaft part or the pump coupling part.

10. The fuel pump module of claim 6, wherein
the fastening portions connected by the guide wall are column shaped and protruding upward from the plate portion, and
the guide wall is disposed around a discharge port of the return valve to surround a side of the discharge port through which return fuel is discharged from the return valve installed on the mount plate.

11. The fuel pump module of claim 10, wherein
the discharge port of the return valve protrudes to a predetermined height downward from the mount plate, and
the guide wall is formed to have a height such that an upper end of the guide wall is positioned higher than a discharge hole through which return fuel is discharged from the discharge port of the return valve.

12. The fuel pump module of claim 10, wherein the guide wall has a V-shape, a curved shape, or an arc shape around the discharge port of the return valve such that the discharge port is positioned inside the guide wall.

13. The fuel pump module of claim 10, wherein the guide wall is disposed at a position at which the guide wall can guide return fuel to an inlet of the channel while blocking the return fuel being forced rearward in the tank when a vehicle accelerates forward, and is disposed around the discharge port of the return valve to surround a rear of the discharge port through which return fuel is discharged from the return valve installed on the mount plate.

14. The fuel pump module of claim 6, wherein the guide wall is disposed at a position at which the guide wall can guide return fuel to an inlet of the channel while blocking the return fuel being forced laterally in the tank when a vehicle accelerates.

15. The fuel pump module of claim 6, wherein the guide wall is disposed at a position at which the guide wall can guide return fuel to an inlet of the channel while blocking the return fuel being forced rearward in the tank when a vehicle accelerates forward, and is disposed around a discharge port of the return valve to surround a rear of the discharge port through which return fuel is discharged from the return valve installed on the mount plate.

16. The fuel pump module of claim 1, wherein the guide wall is disposed at a position at which the guide wall can guide return fuel to an inlet of the channel while blocking the return fuel being forced laterally in the tank when a vehicle accelerates.

17. The fuel pump module of claim 1, wherein the guide wall is disposed at a position at which the guide wall can guide return fuel to an inlet of the channel while blocking the return fuel being forced rearward in the tank when a vehicle accelerates forward, and is disposed around a discharge port of the return valve to surround a rear of the discharge port through which return fuel is discharged from the return valve installed on the mount plate.

18. A fuel pump module for a vehicle, the fuel pump module comprising:
a pump positioned in a reservoir cup in a tank and configured to suction and discharge fuel from the reservoir cup;
a mount plate mounted in an opening of the tank;
a return valve installed on the mount plate and configured to pass return fuel, which is returned from an engine, into the tank;
a shaft bracket connecting the mount plate and the pump to each other in the tank and configured to fix the pump to the mount plate;
a guide wall disposed on the shaft bracket to guide return fuel flowing in the tank through the return valve; and
a channel disposed at the shaft bracket so that return fuel guided by the guide wall flows down and configured to discharge the return fuel, which flows down, into the reservoir cup,
wherein the guide wall is configured to block return fuel, which flows in the tank, from spraying or dispersing laterally when a vehicle, which includes the fuel pump module, accelerates.

* * * * *